(12) United States Patent
Wu

(10) Patent No.: US 6,535,470 B1
(45) Date of Patent: Mar. 18, 2003

(54) METHOD AND APPARATUS FOR WRITING DATA IN A DISK DRIVE

(75) Inventor: Shengquan Wu, Sunnyvale, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 126 days.

(21) Appl. No.: 09/643,129

(22) Filed: Aug. 21, 2000

(51) Int. Cl.$^7$ ................................................. G11B 7/00
(52) U.S. Cl. ................ 369/53.3; 369/47.34; 369/47.51; 369/47.3
(58) Field of Search ............................ 369/47.5, 47.51, 369/47.52, 53.11, 47.55

(56) References Cited

U.S. PATENT DOCUMENTS

| | | | |
|---|---|---|---|
| 4,937,809 A | 6/1990 | Miyadera et al. | ............ 369/116 |
| 5,163,036 A | 11/1992 | Yokogawa | .................... 369/54 |
| 5,502,702 A * | 3/1996 | Nakajo | ........................ 369/116 |
| 5,663,941 A * | 9/1997 | Aoshima | ..................... 369/116 |
| 5,703,865 A * | 12/1997 | Guo | ............................ 369/116 |

OTHER PUBLICATIONS

PCT/US01/25971, Nov. 19, 2001, PCT Search Report.

* cited by examiner

*Primary Examiner*—Nabil Hindi
(74) *Attorney, Agent, or Firm*—Pennie & Edmonds LLP

(57) ABSTRACT

A circuit records data on an optical disk while the disk is rotated at a constant angular velocity. A velocity detector determines a velocity of a rotating disk as a detected velocity. A memory stores sets of write signal control values, and each set of write signal control values is associated with a predefined velocity. A control circuit retrieves at least two sets of write signal control values based on the detected velocity and selected predefined velocities of the sets of write signal control values. A write strategy circuit generates one or more write signals in accordance with the write signal control values of the selected set and write data. The control circuit designates a selected set of write signal control values from the at least two sets of write signal control values while generating the one or more write signals.

13 Claims, 12 Drawing Sheets

Block Diagram of Disk Drive System

Block Diagram of a Disk Drive System

Exemplary 3T pits

Naming for each EFM Pulse

Timing for CD-R    Prior Art

Timing for CD-RW in Default Mode    Prior Art

Timing for CD-RW in Legacy Mode

Memory Map of WCSV

Graph depicting the CLV radially across a disk for a specified CAV

METHOD AND APPARATUS FOR WRITING DATA IN A DISK DRIVE

BRIEF DESCRIPTION OF THE INVENTION

This invention relates generally to writing data in a disk drive. More particularly, this invention relates to a method and apparatus for writing data at a constant angular velocity in a disk drive.

BACKGROUND OF THE INVENTION

Personal computers typically connect to an optical disk drive such as a CD-ROM to read data from a compact disk. On the compact disk, data is stored in the form of pits and lands patterned in a radial track. The track is formed in one spiral line extending from the inner radius of the disk to the outer edge. A pit is a location on the disk where data has been recorded by creating a depression in the surface of the disk with respect to the lands. The lands are the areas between the pits in the tangential direction. The reflectivity of the pits is less than the reflectivity of the lands. To store audio or digital information, the length of the pits and lands is controlled according to a predefined encoding format.

When reading information from the disc, light from a laser beam is directed onto the track and the light beam is reflected back to a photo-sensor such as a photo-diode. Since the pits and lands have different reflectivity, the amount of reflected light changes at the transitions between the pits and the lands. In other words, the encoded pattern of the pits and lands modulates the reflected light beam. The photo-sensor receives the reflected light beam, and outputs a modulated signal, typically referred to as an RF signal, that is proportional to the energy of the light in the reflected light beam.

In FIG. 1, the relationship of the RF signal to the pits 16 and lands 18 is shown. A smaller pit or land decreases both the period and the amplitude of the RF signal. The RF signal in the pits and lands has opposite polarity.

One encoding format used in optical disk systems is eight-to-fourteen modulation (EFM). EFM reduces errors by minimizing the number of zero-to-one and one-to-zero transitions. In other words, small pits and lands are avoided. A one is indicated by a change in the energy of the reflected light beam, that is, a pit edge. A zero is indicated by no change in the energy of the reflected beam for at least two clock periods. Applying the EFM encoding rules, a pit or land will have a length corresponding to the amount of time for at least three and up to eleven clock periods and the electronics will output a corresponding voltage as shown in FIG. 1.

The data is written on the disk via the pits and lands using EFM format. Because of the characteristics of the laser, the media and the recording speed, the EFM signal is adjusted by write strategy electronics which generates laser power control signals that are used to modulate the power of the laser. The write strategy electronics generates the laser power control signals, in addition to other control signals.

The disk controller and disk drive can read data from and write data to disks with a specified constant linear velocity (CLV) at many specified velocities. The term "NX" refers to the specified constant linear velocity of the disk with respect to a base constant linear velocity. The base constant linear velocity is the 1X constant linear velocity, and the specified "NX" constant linear velocity is equal to "N" times the base constant linear velocity of 1X. For example, the specified constant linear velocities include the 1X, 2X, 4X, and 8X constant linear velocities. Typically the specified constant linear velocities are even integer multiples of the 1X velocity.

In FIG. 2, an ideal EFM signal corresponding to a pit or mark that is to be written on the disk is shown. The ideal EFM signal is synchronized to a system clock having a clock period of T. The laser power signal needed to cause the laser to write the ideal EFM signal on the disk is also shown. The write strategy circuit generates the laser power control signals, EFM1, EFM2 and EFM3 that are supplied to laser interface circuitry that are used to generate the laser power signal. FIG. 2 shows the EFM1, EFM2 and EFM3 signals in a CD-Recordable (CD-R) drive. The EFM3 signal controls a low power pre-heat phase of the laser. The EFM2 signal controls the duration of a boost power phase of the laser. The EFM1 signal controls the overall duration of a writing phase of the laser which includes the boost power phase. For the EFM1 signal, the write strategy circuit adjusts the rising and falling edges of the ideal EFM signal in accordance with the write parameters $T_d$ and $T_r$, respectively, and the system clock. For the EFM2 signal, the write strategy circuit adjusts the duration of the EFM2 pulse with respect to the rising edge of the EFM1 signal in accordance with write parameter Tw. For the EFM3 signal, the write strategy circuit adjusts the EFM3 signal with respect to the ideal EFM signal and the system clock in accordance with write parameter $T_h$. To write data accurately, each write parameter, $T_d$, $T_r$, $T_w$ and $T_h$ is adjusted with very high precision, such as $\frac{1}{32}$ T. In one embodiment, $\frac{1}{32}$T is equivalent to 0.9 nanoseconds. The particular values of the write parameters depend, at least in part, on the velocity of the disk.

Using EFM encoding, a 3T symbol is a pulse that has a duration of three clock periods. An 11 T symbol is a pulse that has a duration of eleven clock periods. In CD-ROM disks, the size of the pits and lands for the EFM symbols remains the same across the disk. For example, the length of the pit or land corresponding to a 3T symbol is the same from the innermost radius of the disk to the outermost radius of the disk.

Typically, while an optical disk is being played or read, the optical disk is rotated at the specified constant linear velocity. When the disk is rotated at the specified constant linear velocity and when the head assembly is positioned at the innermost radius of the disk, the disk has a greater angular velocity than when the head assembly is positioned at the outermost radius of the disk. By rotating the disk at a constant linear velocity, the same EFM symbols, such as a 3T symbol, have the same duration when read from any portion of the disk.

Data is also written on the disk at the specified constant linear velocity. Data may be written at different radial positions of the disk. When writing data, if the head assembly is positioned at an innermost track, the angular velocity of the disk will be at a first predetermined value that corresponds to the specified constant linear velocity. When the head is moved to an outer track to write additional data, that data is not written until the angular velocity of the disk is decreased such that the constant linear velocity is maintained. Therefore, writing data at a constant linear velocity incurs latencies while waiting for the velocity of the disk to reach the appropriate constant linear velocity In view of the foregoing, it would be highly desirable to provide a method and apparatus that reduces the latency for writing data on an optical disk. Such a method and apparatus would allow CD-R and CD-Rewritable (CD-RW) disk drives to write to a disk without waiting for the disk to reach a constant linear velocity

SUMMARY OF THE INVENTION

A circuit records data on an optical disk at a constant angular velocity to reduce the amount of time to write data.

A velocity detector determines a velocity of a rotating disk as a detected velocity. A memory stores sets of write signal control values, and each set of write signal control values is associated with a predefined velocity. A control circuit retrieves at least two sets of write signal control values based on the detected velocity and selected predefined velocities of the sets of write signal control values. A write strategy circuit generates one or more write signals in accordance with the write signal control values of the selected set and write data. The control circuit designates a selected set of write signal control values from the at least two sets of write signal control values while the one or more write signals are generated.

In another aspect of the invention, a disc controller uses the circuit to write data on the disk. Yet another aspect of the invention provides a method of recording data on the disk while the disk is rotated at a constant angular velocity.

In an alternate embodiment, position information is used rather than a velocity to determine when to select a different set of write signal control values.

By recording data on the optical disk at a constant angular velocity, the invention reduces the latency of recording data on the optical disk.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
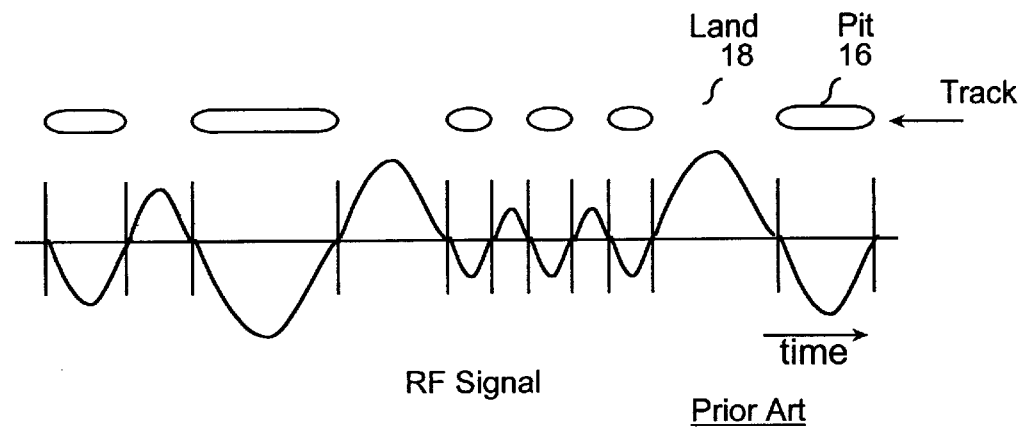
FIG. 1 illustrates the relationship between an analog RF signal and the pits and lands on an optical disk.
Figure 2:
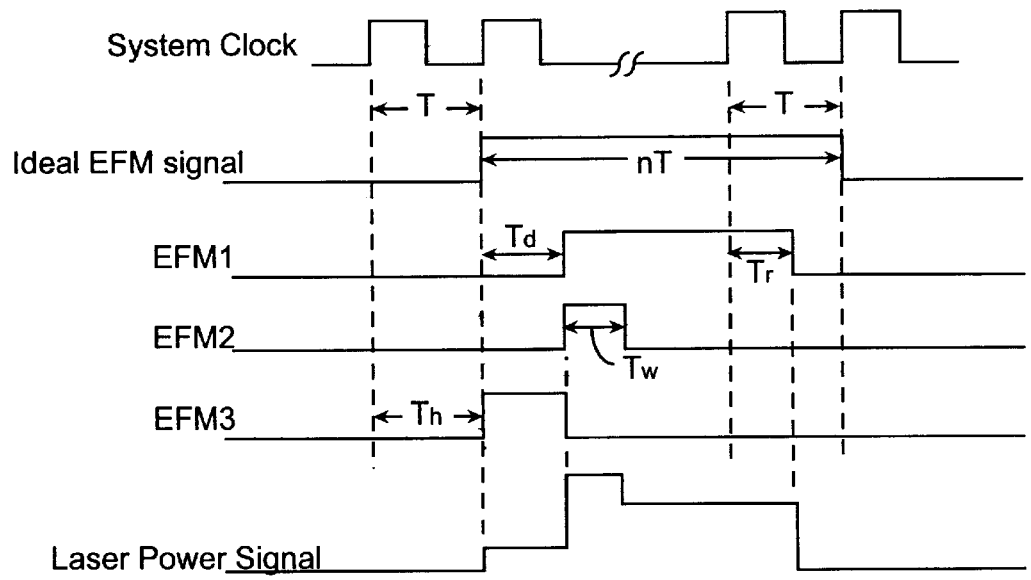
FIG. 2 is a timing diagram illustrating the relationship between an ideal EFM signal, the laser power control signals and the laser output power.
Figure 3:
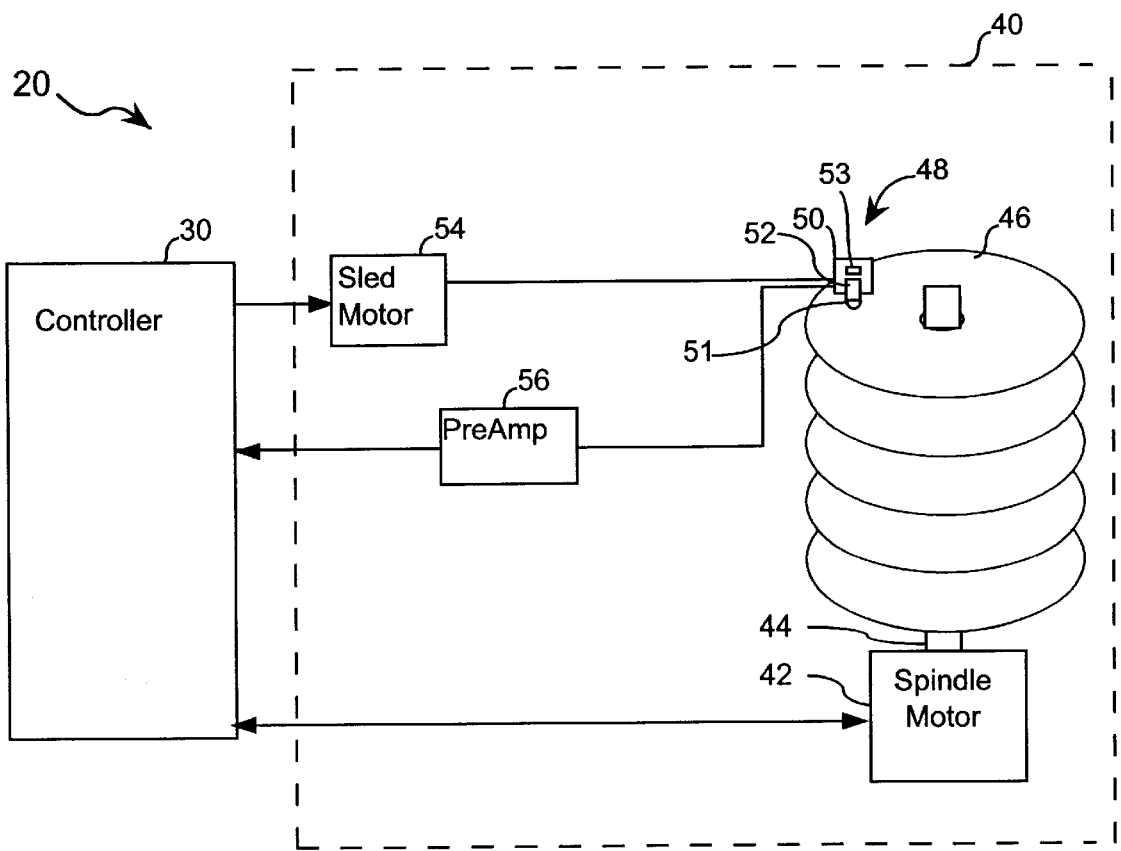
FIG. 3 illustrates a general architecture of a disk drive system in accordance with an embodiment of the present invention.

In FIG. 3, a disk drive system 20 has a controller unit 30 that connects to a disk drive 40, such as an optical disk drive. In the optical disk drive 40, a spindle motor 42 is attached to a spindle 44 which supports at least one disk 46. In response to commands from the controller unit 30, the spindle motor 42 rotates the spindle 44 and therefore the disks 46.

While the disk 46 is rotating, an optical head assembly 48 reads information from or write information to the disk 46. The optical head assembly 48 includes a sled carriage 50, a lens 51, an actuator 52 and a photo-sensor 53. The sled carriage 50 supports the photo-sensor 53 and the actuator 52. The actuator 52 is a voice coil motor that supports and positions the lens 51. The lens 51 transmits a light beam from a laser diode to the disk surface 46 and transmits the reflected light beam from the disk surface 46 to the photo-sensor 53. The, sled motor 54 moves the optical head assembly 48 including the actuator 52 to position the optical head assembly 48 with respect to a target track on the disk 46. The actuator 52 finely positions the lens 51 over the target track's centerline.

A preamplifier 56 receives the analog RF signal from the head 48 and outputs an analog read channel signal.

In one embodiment, the spindle 44 supports a single disk. In an alternate embodiment, the spindle 44 supports multiple disks, and each disk is associated with an optical head assembly 48.

Figure 4:
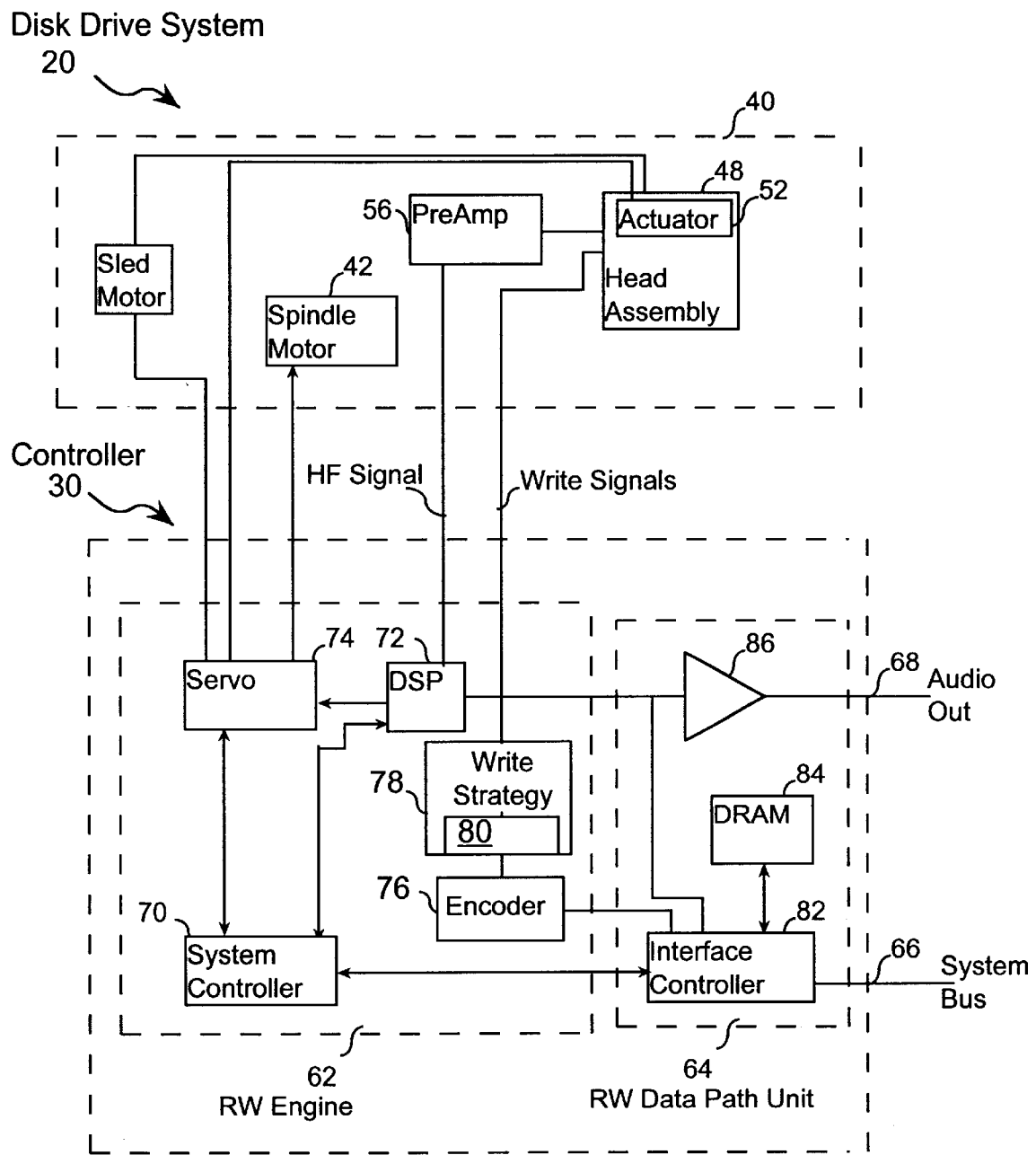
FIG. 4 illustrates a general architecture of a disk controller in accordance with an embodiment of the present invention.

FIG. 4 is a more detailed block diagram of the disk controller 30 and its associated disk drive 40. The disk controller 30 has a read/write (RW) engine 62 that connects to a read/write data path unit 64. The RW engine 62 communicates directly with the disk drive 40 while the RW datapath unit 64 communicates with a system bus 66 and supplies an audio signal to an audio output line 68.

The RW engine 62 has a system controller 70, a digital signal processor 72 and a servo control unit 74. The system controller 70 receives commands from and sends status to a system bus 66 via the RW datapath unit 64. In response to the commands from the system bus 66, the system controller 70 sends commands to and receives status information from the digital signal processor (DSP) 72 and the servo control unit 74 to read data from or write data to the disk.

The servo control unit 74 positions the head with respect to a target track, and then keeps the head 48 centered and focused on the target track. To do so, the servo control unit 74 receives the control signals from the DSP 72. The servo control unit 74 sends signals to the sled motor 54, actuator 52 and spindle motor 42 to control focusing and tracking. The servo control unit 74 communicates with the spindle motor 42, the actuator 52 and the sled motor 54 to position the optical head 48 precisely to read the desired information from the disk 46.

The DSP 72 receives the analog read channel signal from the preamplifier 56. The analog read channel signal includes both digital data and control information. The DSP 72 processes the analog read channel signal and outputs control signals that are used by the servo control unit 74.

To write data to a disk, an encoder 76 receives data bytes from the read/write data path unit 64, encodes the data bytes to generate an internal EFM signal and outputs control signals. The encoder 76 encodes the data for a specified velocity.

A write strategy circuit 78 receives the internal EFM signal from the encoder 76 and write settings from the system controller 70, and outputs the laser power control signals. Depending on the specified velocity and the serial bit pattern being written to the disk, the write strategy circuit 78 generates the laser power control signals with respect to the rising and falling edges of the clock signal as described above. In particular, the write strategy circuit 78 includes the circuit 80 of the present invention that adjusts the write parameters while writing data while the disk is being rotated at a constant angular velocity. The circuit 80 will be further discussed below with reference to FIG. 15.

In the read/write data path unit 64, when writing data to a disk, an interface controller 82 receives the data from the system bus 66, processes the data, and stores the data in the DRAM 84. The interface controller 82 sends the data bytes from the DRAM 84 to the encoder 76

When reading data from the disk, the interface controller 82 receives the digital data signal from the DSP 72 in a serial stream, descrambles the data, and assembles the data into eight-bit bytes. The interface controller 82 then stores the data in the DRAM 84. The DRAM 84 acts as a buffer for the digital data from the DSP 72. The interface controller 82 also performs error detection and correction operations on the buffered data and transfers the data to the system bus 66.

To provide an audio output, a digital-to-analog converter (DAC) 86 receives the digital data signal from the DSP 72 and outputs an audio signal on the audio output line 68.

Figure 5:
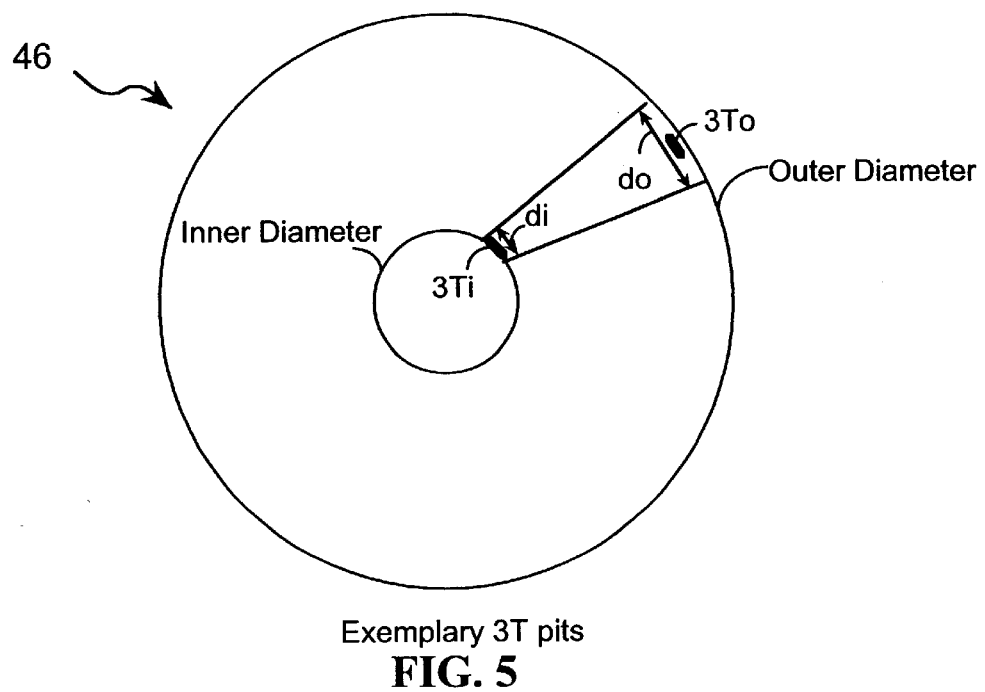
FIG. 5 illustrates an exemplary 3T symbol at different radial positions on the disk.

In FIG. 5, an exemplary 3T symbol (3Ti) is written on an innermost track of the disk 46. The length of the pit or land of the 3Ti symbol is equal to di. While writing the symbol 3Ti, the disk 46 will rotate for a predetermined amount of time ta. Because data is written to the disk 46 while the disk is rotating at the specified constant linear velocity, the length of the 3T symbol will be substantially the same across the disk 46. That is, the 3T symbol will have substantially the same length di on the inner and outer tracks. In other words, the length of the symbol 3Ti will be substantially the same as the length of the symbol 3To. If the disk is rotating at a constant angular velocity rather than the constant linear velocity, the distance traveled in a period of time t is greater at an outer track than an inner track. For example, if distance di is traversed during time t at an inner track, a longer distance do is traversed at the outer track.

Typically, to record data on an optical disk at a constant linear velocity, the head is positioned with respect to the target track and data is not recorded until the instantaneous linear velocity of the disk reaches a specified constant linear velocity. Although the disk may be rotating at the specified constant linear velocity while the head is positioned over one track, when changing tracks, the velocity of the disk may need to be adjusted to maintain the specified constant linear velocity. For example, when the head is re-positioned from an innermost track to an outermost track, the velocity of the disk is reduced until the specified constant linear velocity is reached, then the data is written. When the head is re-positioned from an outermost track to an innermost track, the velocity of the disk is increased until the specified constant linear velocity is reached, then the data is written.

Figure 6:
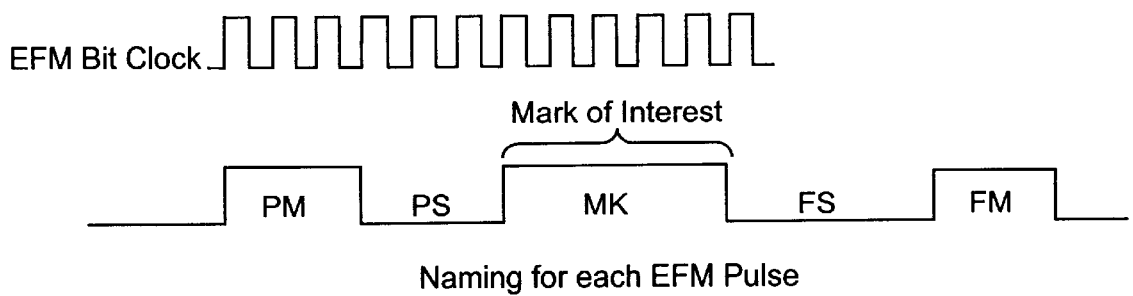
FIG. 6 illustrates the naming conventions for a sequence of EFM pulses.

In FIG. 6, the naming conventions for a sequence of EFM data from the internal EFM signal are shown. The mark of interest (MK) is the mark or pit that is currently being written. The previous space (PS) is the size of the space or land preceding the mark of interest. The previous mark (PM) is the preceding mark that was written. The following space (FS) is the space after the mark of interest. The following mark (FM) is the next pit that will be written. Because of the thermal properties of the laser, the previous mark (PM) can affect the size of the mark of interest (MK) if the previous space (PS) is sufficiently small, such as a space corresponding to a 3T symbol.

FIG. 6 also shows the relationship between the EFM Bit clock and the internal EFM signal. For example, the previous mark, PM, extends over three clock periods of the EFM bit clock and is therefore a 3T symbol. The previous space, PS, extends over three clock periods of the EFM bit clock and is also a 3T symbol. The mark of interest, MK, extends over five clock periods of the EFM bit clock and is therefore a 5T symbol.

Figure 7:
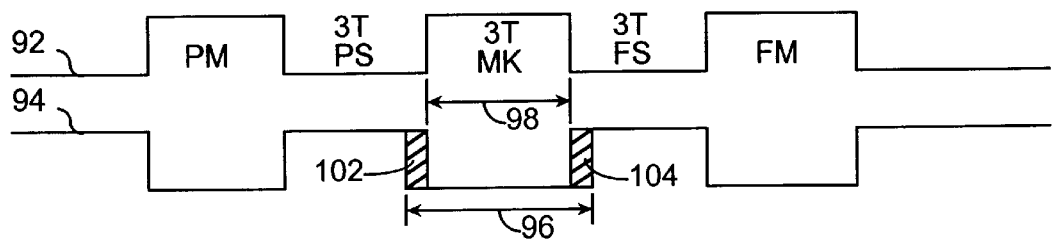
FIG. 7 illustrates a change in the width of the mark of interest based on the width of the previous mark, previous space, following mark and following space in the sequence of EFM signals.

In FIG. 7, an example of interference between successive marks from the thermal characteristics of the laser is shown. In an ideal case, a first EFM signal 92 is written to the disk without any timing adjustment for thermal effects of the laser. In practice, if the first EFM signal 92 is not adjusted, as shown by a second EFM signal 94, the mark of interest 96 written on the disk is wider than the ideal mark 98 because of heat retention by the laser. In the second EFM signal 94, the shaded areas 102, 104 represent the range of deviation with respect to the first EFM signal because the pit written on the disk is wider than the ideal. As the size of the previous and following spaces, PS and FS, respectively, increases, the size of the pit for the mark of interest 98 is less affected by the previous and following marks, PM and FM, respectively.

Figure 8:
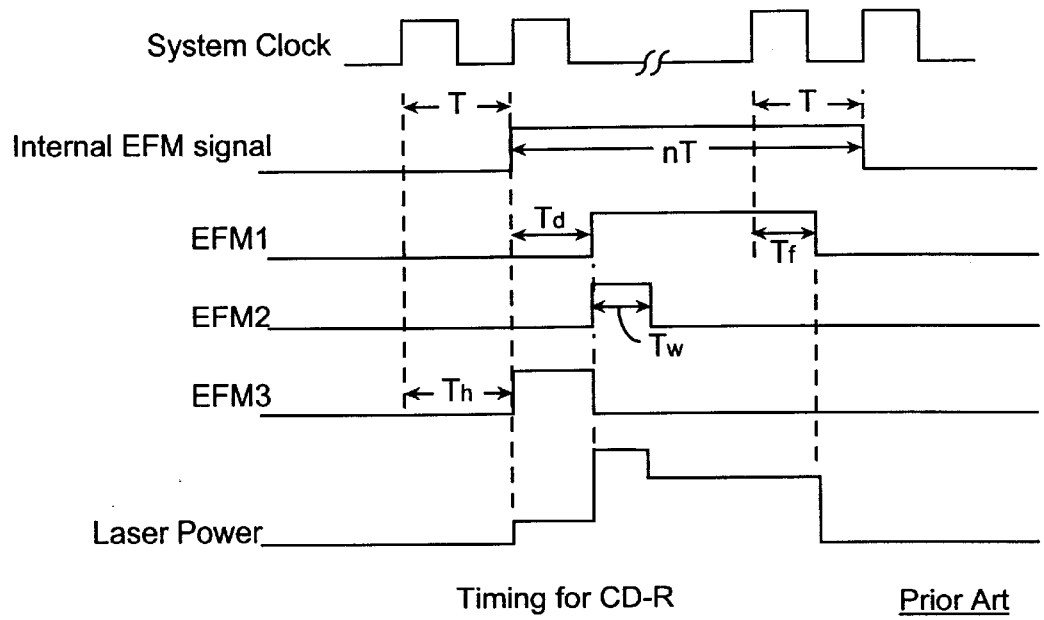
FIG. 8 is a timing diagram of an internal EFM signal, the laser power control signals and the laser output power when writing data in a CD-R disk drive.

In FIG. 8, a timing diagram for a CD-R disk drive is shown. To generate the laser power control signals, the internal EFM signal, which specifies the length of the EFM symbol, is received. The internal EFM signal is synchronized to the system clock. The write strategy circuit generates the EFM1, EFM2 and EFM3 signals based on the internal EFM signal, the sequence of EFM data, and the write parameters. The write parameters include Th, Td, Tw and Tf, as shown in FIG. 8 and discussed below.

For a CD-R disk drive, write parameter Td defines the delay time from the rising edge of the internal EFM signal to the rising edge of the EFM1 signal. Write parameter Tw defines the pulse width of the EFM2 signal. Write parameter Tf defines the time between the rising edge of the system clock one clock period prior to the falling edge of the internal EFM signal and the falling edge of the EFM1 signal. Write parameter Th defines the time between the rising edge of the system clock one clock period prior to the rising edge of the internal EFM signal and the rising edge of the EFM3 signal.

As shown in table one, below, the EFM symbols, which represent the mark of interest MK, previous space PS, previous mark PM, following space FS, and following mark FM, are divided into eight groups according to their lengths: 3T, 4T, 5T, 6T, 7T, 8–9T, 1T and 11T.

TABLE 1

Code Conversion Table

| PS, PM, MK, FS, FM | Code |
|---|---|
| 3T | 0 |
| 4T | 1 |
| 5T | 2 |
| 6T | 3 |
| 7T | 4 |
| 8T and 9T | 5 |
| 10T | 6 |
| 11T | 7 |

Each group or symbol is represented by a distinct code. For example, the 3T symbol is represented by a code of "0." The marks in the different groups can have different values of Td, Tw, Tf and Th. In addition, the values of write parameters Td, Tw, Tf and Th are changed in accordance with the velocity of the disk. The values of write parameters Td and Tf may also be changed according to the mark's previous space, previous mark, following space and following mark when dynamic write strategy is used.

Figure 9:
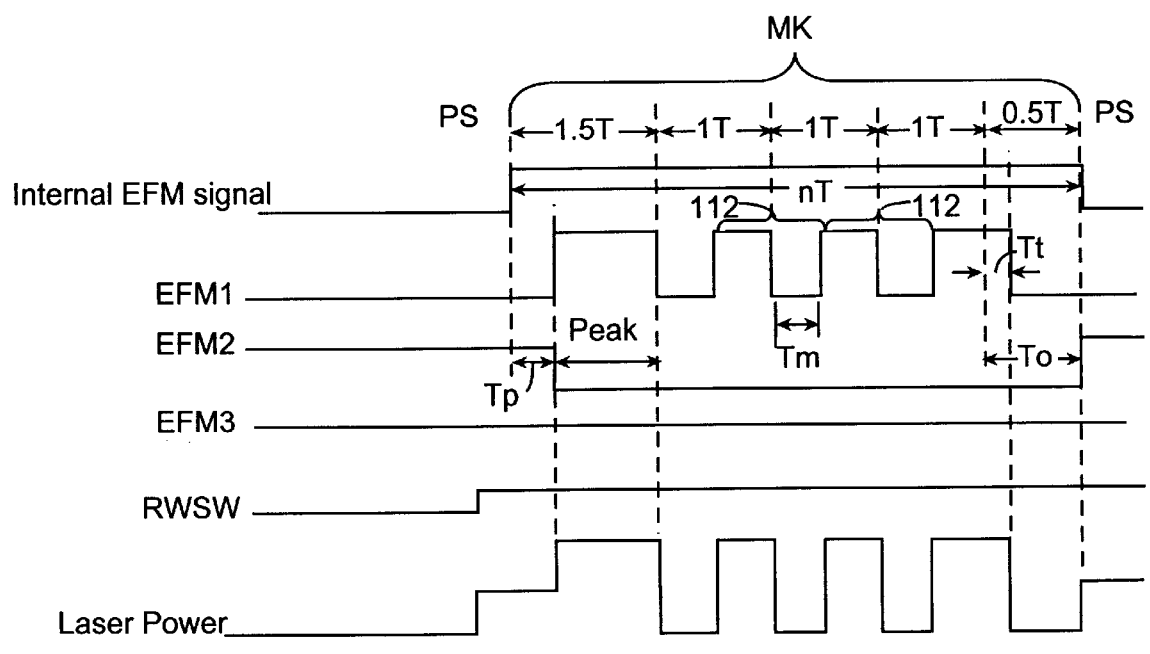
FIG. 9 is a timing diagram of the laser control signals and laser power to write data in a CD-RW disk drive in default mode.

In FIG. 9, a timing diagram for a CD-RW disk drive in default mode is shown. The write strategy circuit generates the EFM1, EFM2 and EFM3 signals based on the internal EFM signal, the sequence of EFM data, and the write parameters. For a CD-RW disk drive, the EFM1, EFM2 and EFM3 signals together control the laser power as indicated.

The EFM signals of FIG. 9 have three intervalsz—a peak interval, a middle interval and an off interval, and write parameters Tp, Tm. Tt and To are used to adjust the timing of the intervals. Write parameter Tp defines the delay time from the rising edge of the internal EFM signal to the rising edge of the peak pulse. In one implementation, write parameter Tp is equal to one and one-half times the clock period of the system clock (1.5T). Each middle pulse 112 has a low and a high value. Write parameter Tm defines the duration of a low value of the middle pulses 112. The total duration of the low and high values of each middle pulse 112 is equal to the period of the system clock, 1T. Write parameter Tt defines the time between the rising edge of the system clock one clock period prior to the falling edge of the internal EFM signal and the falling edge of the last pulse of the EFM1 signal. Write parameter To defines the time between the rising edge of the system clock one clock period prior to the falling edge of the internal EFM signal and the rising edge of the erase signal.

For CD-RW drives, the symbols are divided into eight groups as described above with reference to table one. The marks in the different groups can have different values of write parameters Td, Tw, Tf and Th. Furthermore, write parameters Td and Tf are changed for the mark of interest in accordance with the values of PS, PM, FS and FM. In addition, the values of the write parameters Td, Tw, Tf and Tb are modified in accordance with the velocity of the disk.

Figure 10:
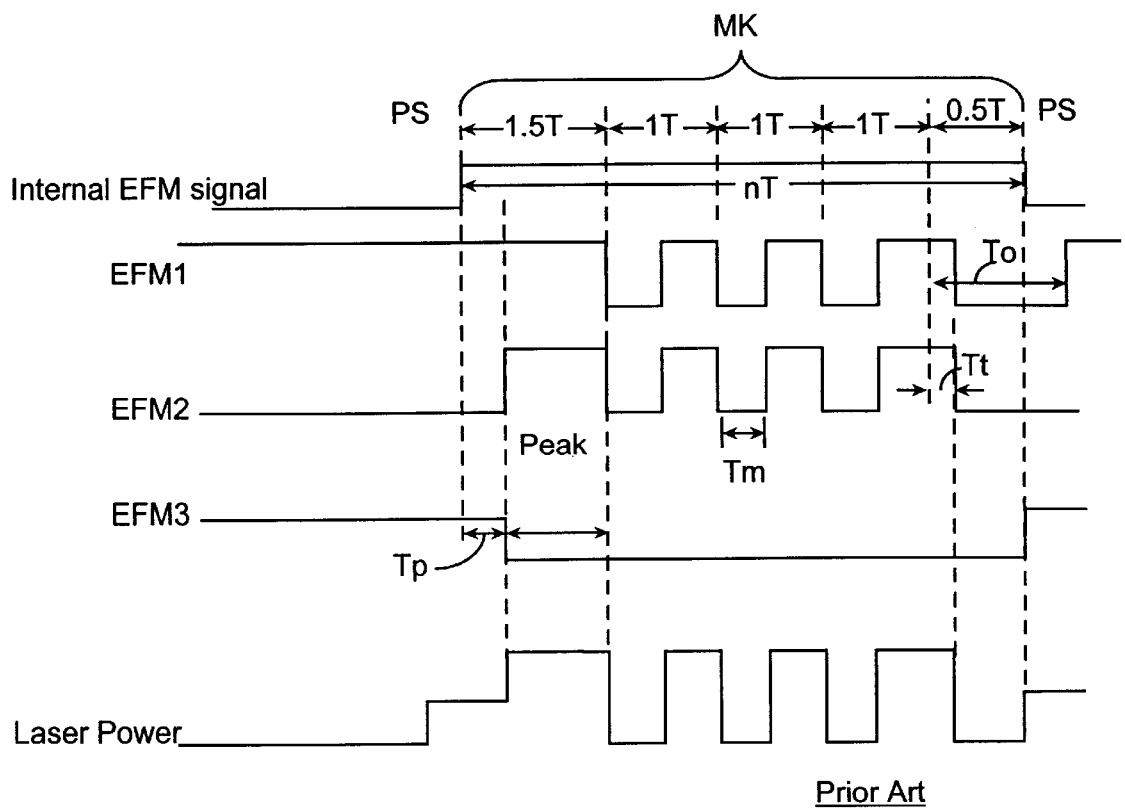
FIG. 10 is a timing diagram of the laser control signals and laser power to write data in a CD-RW disk drive in legacy mode.

As shown in FIG. 10, CD-RW disk drives in legacy mode use the same write parameters as CD-RW disk drives in default mode, but apply the write parameters in a different manner from FIG. 9 to generate the EFM1, EFM2 and EFM3 signals.

A set of EFM delay parameters is shown in table two below, the EFM delay parameters (EFMDx) differ depending on the type of disk drive. EFM delay parameter EFMD1 represents write parameter Td for CD-R drives and write parameter Tp for CD-RW drives. EFM delay parameter EFMD2 represents write parameter Tf for CD-R drives and write parameter To for CD-RW drives. EFM delay parameter EFMD3 represents write parameter Tw for CD-R drives and write parameter Tm for CD-RW drives. EFM delay parameter EFMD4 represents write parameter Th for CD-R drives and write parameter Tt for CD-RW drives.

TABLE 2

Delay Parameters for CD-R and CD-RW Drives

| Parameter | CD-R | CD-RW |
|---|---|---|
| EFMD1 | Td | Tp |
| EFMD2 | Tf | To |
| EFMD3 | Tw | Tm |
| EFMD4 | Th | Tt |

Because information is typically written on the disk after the disk has reached the specified constant linear velocity, typically one set of delay parameters is used in accordance write the specified constant linear velocity for the disk. During writing, the EFM1, EFM2 and EFM3 signals are generated in accordance with the EFM delay parameters listed above. The EFM delay parameters are generated in accordance with a selected set of write signal control values stored in a memory. A set of write signal control values is selected in accordance with the specified constant linear velocity of the disk, the type of disk drive (CD-R or CD-RW), and the sequence of EFM symbols.

In a noteworthy aspect of the present invention, data is written on the disk at a constant angular velocity. To write data on the disk at a constant angular velocity, different sets of write signal control values, associated with the different nominal constant linear velocities, are selected to adjust the delay parameters in accordance with the instantaneous linear velocity of the disk.

For a CD-R disk drive, the EFMD1 and EFMD2 signals are generated in accordance with relationships one and two as follows:

$$\text{EFMD1} = TL_I(MK) + TL_P(PS,PM) + TL_F(MK,FS,FM) \tag{1}$$

$$\text{EFMD2} = TF_I(MK) + TF_F(PS,PM) + TF_P(MK,FS,FM) \tag{2}$$

$TL_I(MK)$, $TF_I(MK)$, $TL_F$, $TF_P$, $TL_P$ and $TF_F$ represent different components of EFMD1 and EFMD2. For example, the values for TLi (MK) and TFi(MK) are read from a memory (FIG. 12) according to the value of the mark of interest, MK. The values for $TL_P$ (PS,PM) and $TF_F$ (PS,PM) are read from the memory according to the values of the previous space, PS, and the previous mark, PM. The values for $TL_F$ (MK, FS, FM) and $TF_P$ (MK, FS, FM) are read from the memory according to the values of the mark of interest, MK, the following space, FS, and the following mark, FM.

Figure 11:
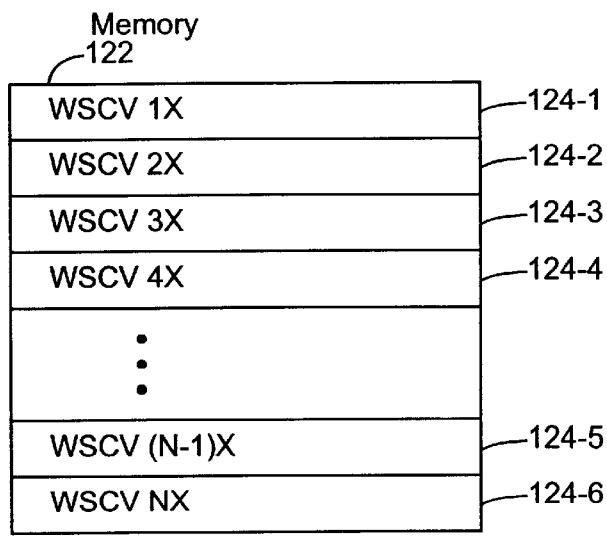
FIG. 11 illustrates a memory that stores sets of write signal control values in accordance with an embodiment of the present invention.

Referring to FIG. 11, a memory 122 stores sets of write signal control values (WSCV) 124. A set of write signal control values are stored for each of the specified nominal constant linear velocities. Because of acceptable tolerances in the size of the marks and fluids, each nominal constant linear velocity and set of write signal control values 124 is associated with a range of linear velocities. When writing data at a constant angular velocity across the disk, the detected instantaneous linear velocity of the disk may transition through one or more nominal constant linear velocities.

Figure 12:
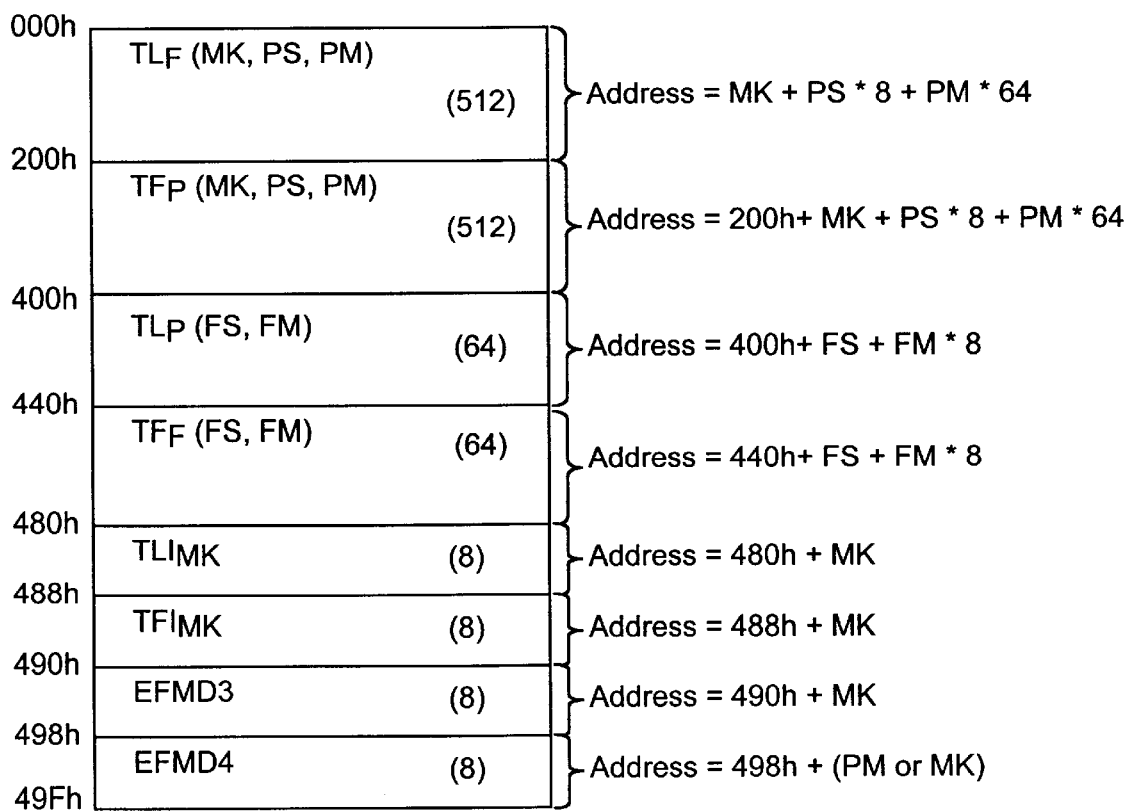
FIG. 12 illustrates an exemplary set of write signal control values of the memory of FIG. 11.

Referring to FIG. 12, a mentors map of an exemplary set of write signal control values is shown. Each set of write signal control values includes the following subsets of timing parameter values $TL_F$, $TF_P$, $TL_P$, $TF_F$, TLI, TFI, EFMD3 and EFMD4. A particular timing parameter value is selected in accordance with its address. For instance, each $TL_F$ value is a function of the code for the MK, PS and PM as shown above in table one. In the following relationships, the terms MK, PS. PM, FS, and PM refer to the associated code. Each $TL_F$ value is six bits wide and the memory stores 512 $TL_F$ values. For the subset of $TL_F$ values, a particular value of $TL_F$ is retrieved from the following address of a memory location in accordance with relationship three as follows:

$$\text{Address}=MK+PS*8+PM*64. \quad (3)$$

The subset of $TF_P$ values are also a function of the MK, PS and PM. Each $TF_P$ value is six bits wide and the memory stores 512 $TF_P$ values. The $TF_P$ values are addressed in accordance with relationship four as follows:

$$\text{Address}=200\ h+MK+PS*8+PM*64. \quad (4)$$

The subset of $TL_P$ values are a function of the following space (FS) and following mark (FM). Each $TL_P$ value is six bits wide and the memory stores 64 $TL_P$ values. $TL_P$ values are addressed in accordance with relationship five as follows:

$$\text{Address}=400\ h+FS+FM*8. \quad (5)$$

The subset of $TF_F$ values are a function of the following space (FS) and following mark (FM). Each $TF_F$ value is six bits wide and the memory stores 64 $TF_F$ values. $TF_F$ values are addressed in accordance with relationship six as follows:

$$\text{Address}=440\ h+FS+FM*8. \quad (6)$$

The subset of TLI values are a function of the mark of interest MK. Each TLI value is six bits wide and the memory stores eight TLI values. The TLI values are addressed in accordance with relationship seven as follows:

$$\text{Address}=488\ h+MK. \quad (7)$$

The subset of TFI values are a function of the mark of interest MK. Each TFI value is six bits wide and the memory stores eight TFt values. The TFI values are addressed in accordance with relationship eight as follows:

$$\text{Address}=488\ h+MK. \quad (8)$$

The subset of EFMD3 values are a function of the mark of interest MK. Each EFMD3 value is six bits wide and the memory stores eight EFMD3 values. The EFMD3 values are addressed in accordance with relationship nine as follows:

$$\text{Address}=490\ h+MK. \quad (9)$$

The subset of EFMD4 values are a function of the either the mark of interest MK or the previous mark PM depending on a write setting in a control register. Each EFMD4 value is six bits wide and the memory stores eight EFMD4 values, The EFMD4 values are addressed in accordance with relationship ten as follows:

$$\text{Address}=498\ h+MK. \quad (10)$$

Figure 13:
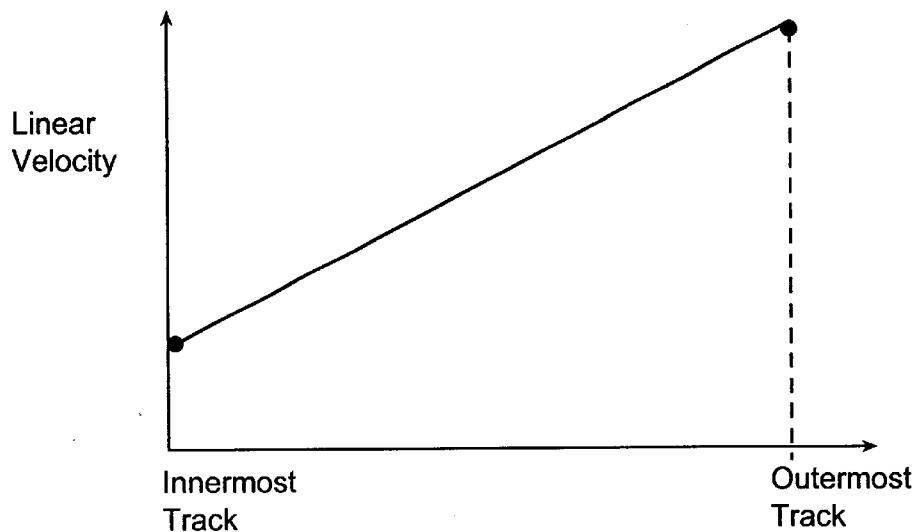
FIG. 13 is a graph depicting the ideal relationship between a constant linear velocity across a disk with respect to a constant angular velocity.

FIG. 13 is a graph depicting the ideal relationship between a linear velocity across a disk that is rotating at a specified predetermined constant angular velocity. The x-axis represents locations on the disk from the innermost track to the outermost track. The y-axis represents the ideal linear velocity at a track. For the specified predetermined constant angular velocity, the linear velocity at the innermost track is less than the linear velocity at the outermost track.

Figure 14:
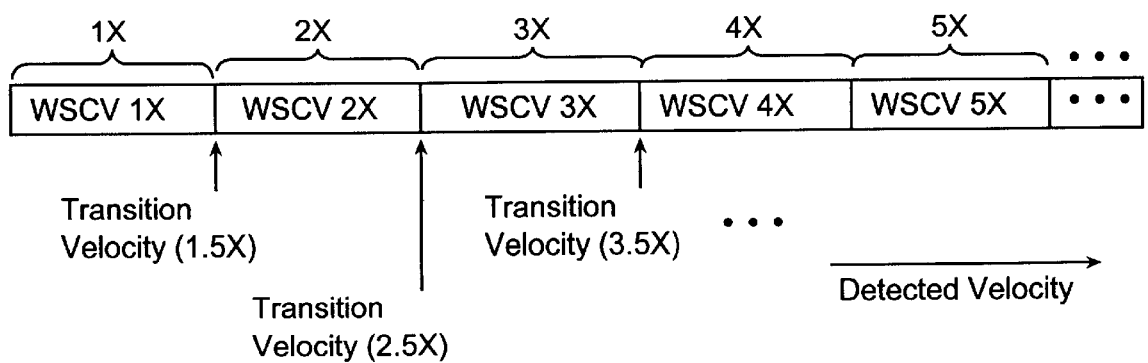
FIG. 14 illustrates the changing of the sets of write signal control values in accordance with the detected velocity of the disk as a head assembly is positioned radially across a disk that is being rotated at a predetermined constant angular velocity.

FIG. 14 illustrates the changing of the sets of write signal control values in accordance with the detected velocity of the disk as a head assembly is positioned radially across a disk that is being rotated at a predetermined constant angular velocity. Each set of write signal control values (WSCV) is associated with a specified range of linear velocities. For example, the set of write signal control values for the nominal 1X constant linear velocity (WSCV 1X) is associated with a range of linear velocities.

Certain nominal constant linear velocities are typically specified for use with a particular disk, such as 1X, 2X, 4X, 6X and 8X. Each of these typical nominal constant linear velocities has an associated set of write signal control values. In another noteworthy aspect of the invention, additional sets of write signal control values that are associated with nominal constant linear velocities not typically used with an optical disk are stored and used to write data at a constant angular velocity. For example, a set of write signal control values associated with the nominal 3X and 5X constant linear velocities are stored and used to write data.

In another example, a disk is rotated at a predetermined constant angular velocity and an optical head assembly is initially positioned with respect to the disk at a track associated with the 1X nominal constant linear velocity. The set of write signal control values associated with the 1X nominal constant linear velocity (WSCV 1X) are used to write data. The optical head assembly is moved radially across the disk to an outer position and the detected linear velocity at each track increases. When the detected linear velocity reaches a predetermined transition velocity, such as 1.5 times the nominal 1X constant linear velocity, referred to as 1.5X, the set of write signal control values associated with the 2X constant linear velocity are used to write data. The velocity of the disk is repeatedly detected and sets of write signal control values are changed when the detected linear velocity of the disk reaches the next transition velocity. In this way, data is continuously written on the disk while the disk is rotated at a constant angular velocity, and the latency of writing data is reduced.

Figure 15:
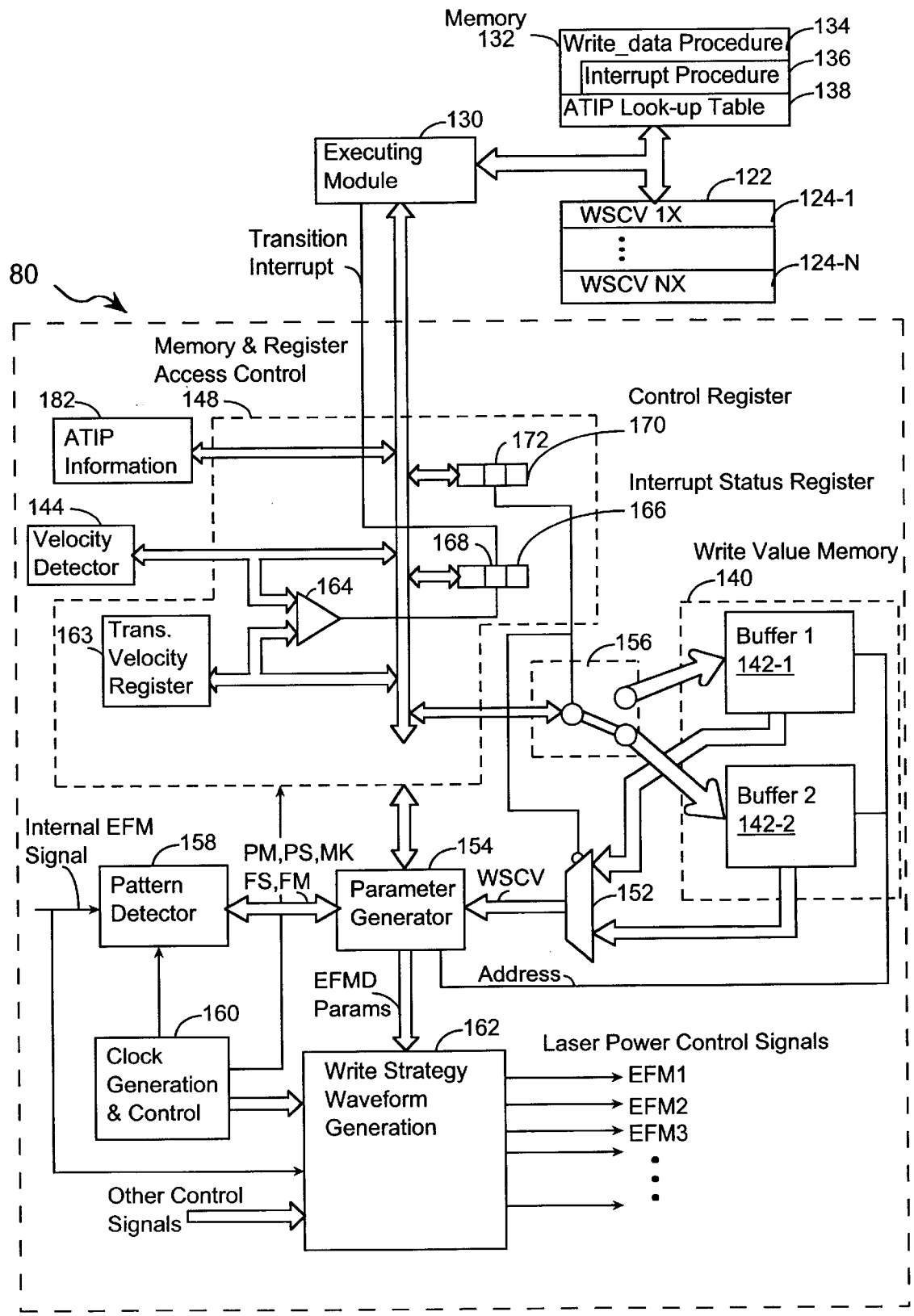
FIG. 15 illustrates a circuit that selects the different sets of write signal control values that are used to write data while the velocity of the disk is changing to a target velocity in accordance with an embodiment of the present invention.

In FIG. 15, an executing module 130 is coupled to the circuit 80 of the present invention. The executing module 130 is also coupled to a memory 132 that stores a write_data procedure 134, which includes an interrupt procedure 134, and an ATIP look-up table 138. The executing module 130 is also coupled to the memory 122 that stores the sets of write signal control values 124. In one implementation, a single memory stores the write_data procedure 134 and the sets of write signal control values 124.

The circuit 80 implements the method of recording data on an optical disk while the disk is rotating at a constant angular velocity. The circuit 80 includes:

a write value memory 140 with at least two buffers 142 for storing at least two sets of write signal control values;

in an alternate embodiment, the write value memory 140 is a dual-ported static random access memory (SRAM);

a velocity detector 144 that detects the instantaneous linear velocity of the disk as a detected velocity;

a memory and register access control block 148 that controls the flow of the sets of write signal control values into and out of the write value memory 140 and to the parameter generator 154;

a switch 156 that selects which buffer 142 to load with the next set of write signal control values; preferably, the switch is implemented electronically;

a pattern detector 158 that identifies the PM, PS, MK, FS and FM;

the parameter generator 154 that receives the selected set of write signal control values from the multiplexor 152 and generates the EFMD parameters based on the PM, PS, MK, FS and FM and the selected set of WSCV; the parameter generator 154 is responsive to control signals from the memory & register access control block 148;

a clock generation and control block 160 that generates the timing of the circuit 80; and a write strategy waveform generation circuit 162 that generates the laser power control signals EFM1, EFM2 and EFM3 based on the EFMD parameters.

In the prior art, because data was only written at a specified constant linear velocity, a single write value memory that stored only one set of write signal control values was used. In another noteworthy aspect of the invention, to write data at a constant angular velocity, the write value memory 140 stores two or more sets of write signal control values and alternately outputs specified sets of write signal control values in accordance with the detected velocity. In one implementation, the write value memory is implemented as a ping-pong buffer. Because multiple sets of write signal control values are stored and ready for output in the write value memory, the memory and register access control block 148 switches between sets of write signal control values while writing data, thereby allowing the data to be written to the disk continuously.

In particular, the memory & register access control block 148 includes a transition velocity register 163, which the executing module 130 loads with a transition velocity. A comparator 164 compares the value in the transition velocity register 163 to the detected velocity from the velocity detector 144. When the value of the transition velocity in the transition velocity register 163 is equal to the detected velocity, the comparator 164 generates a transition pulse. Initially, in an interrupt status register 166, a transition interrupt bit 168 is reset to zero. The transition pulse sets the transition interrupt status bit 168 to a one and asserts a transition interrupt signal. The executing module 130 senses the asserted transition interrupt signal, and in response, executes the interrupt procedure 136 which reads the value of the interrupt status register 166. When the value of the transition interrupt status bit 168 is equal to one, the executing module 130 recognizes that the detected velocity of the disk is equal to the transition velocity. The executing module 130 then writes to the interrupt status register 166 to clear the interrupt by setting the transition velocity bit to equal zero.

In a control register 170, a switch control bit 172 determines which buffer 142 is loaded with write signal control values and which buffer 142 supplies write signal control values to the parameter generator 154. Initially, the control register 170 is reset to zero, thereby setting the switch control bit 172 in the control register 170 to zero. When the switch control bit 172 is equal to zero, the switch 156 enables buffer 1 142-1 to be loaded with write signal control values, while the multiplexor 152 supplies write signal control values from buffer 2 142-2 to the parameter generator 154. When the switch control bit 172 is equal to one, the switch 156 enables buffer 2 142-2 to be loaded with write signal control values, while the multiplexor 152 supplies write signal control values from buffer 1 142-1 to the parameter generator 154. In response to the transition interrupt, the executing module 130 toggles the switch control bit 172 to its complementary value to switch the buffers 142. The executing module 130 then determines a new transition velocity and loads that transition velocity in the transition velocity register 163, and loads the next set of write signal control values into the selected buffer 142.

In one embodiment, the executing module 130 is a microcontroller. In an alternate embodiment, the executing module 130 is the system controller 70 of FIG. 4. In another alternate embodiment, the executing module 130 is a logic circuit. The executing module 130 can also read the detected velocity from the velocity detector 144.

Figure 16:
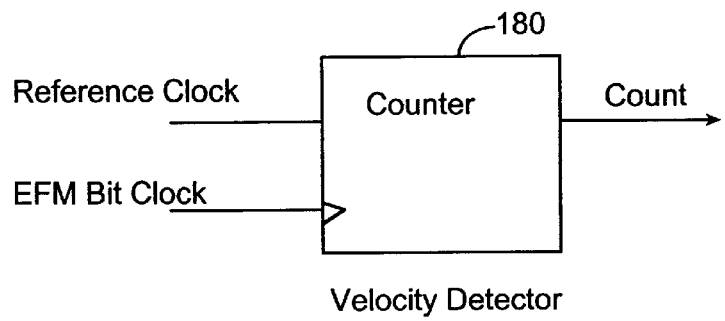
FIG. 16 illustrates a velocity detector in accordance with an embodiment of the present invention.

In FIG. 16, one implementation of the velocity detector 144 is shown. A counter 180 a reference clock that runs at a 1X speed. In a preferred implementation, the reference clock is further divided down from the 1X speed to increase the precision of the detected linear velocity. The counter 180 receives the EFM bit clock on its clock input. The EFM bit clock is generated by the clock generation and control block 148.. A detected velocity value is directly proportional to and represents the instantaneous linear velocity of the disk. The counter 180 counts the number of pulses of the EFM bit clock in one reference clock period which is output as the detected velocity value.

Referring back to FIG. 15, in an alternate embodiment, the executing module 130 derives the detected velocity value from the minute, second and frame information from the ATIP field of the disk and the specified predetermined constant angular velocity, ATIP is a well-known acronym for "Absolute Time in Pregroove." An ATIP information register 182 supplies the ATIP information which includes time code information in minutes, seconds and frames that specifies physical locations on the disk. The ATIP look-up table 138 associates ranges of ATIP timing information with predetermined velocity conversion factors. The velocity conversion factors of the ATIP look-up table 138 are predetermined in accordance with nominal constant linear velocities. The executing module 130 determines the velocity conversion factor for the current ATIP information in the ATIP information register 182 from the ATIP look-up table 138, and multiplies the predetermined constant angular velocity by the velocity conversion factor to generate the detected velocity value.

Figure 17:
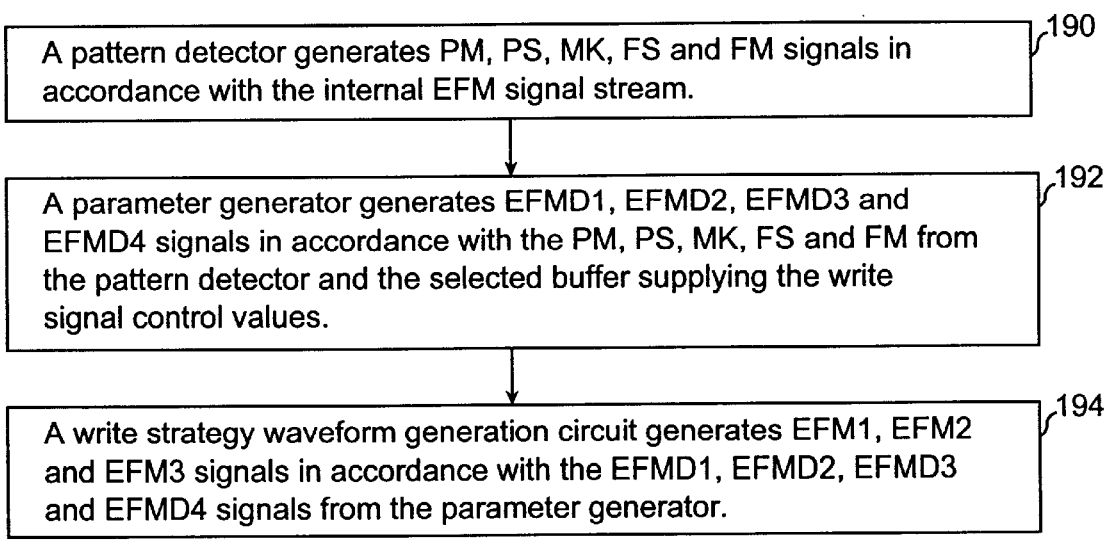
FIG. 17 is a flowchart that illustrates the operation of the circuit of FIG. 15.

FIG. 17 is a flowchart that illustrates a portion of the write operation using the circuit of FIG. 15. In step 190, the pattern detector 158 generates the PM, PS, MK, FS and FM in accordance with the internal EFM signal. In step 192, the parameter generator 154 generates the EFMD1, EMFD2, EFMD3 and EFMD4 signals in accordance with the PM, PS, MK, FS and FM signals from the pattern detector 158 and the selected buffer supplying the write signal control values. In step 194, the write strategy waveform generation circuit 162 generates the EFM1, EFM2 and EFM3 signals in accordance with the EFMD1, EMFD2, EFMD3 and EFMD4 signals from the parameter generator 154.

Figure 18:
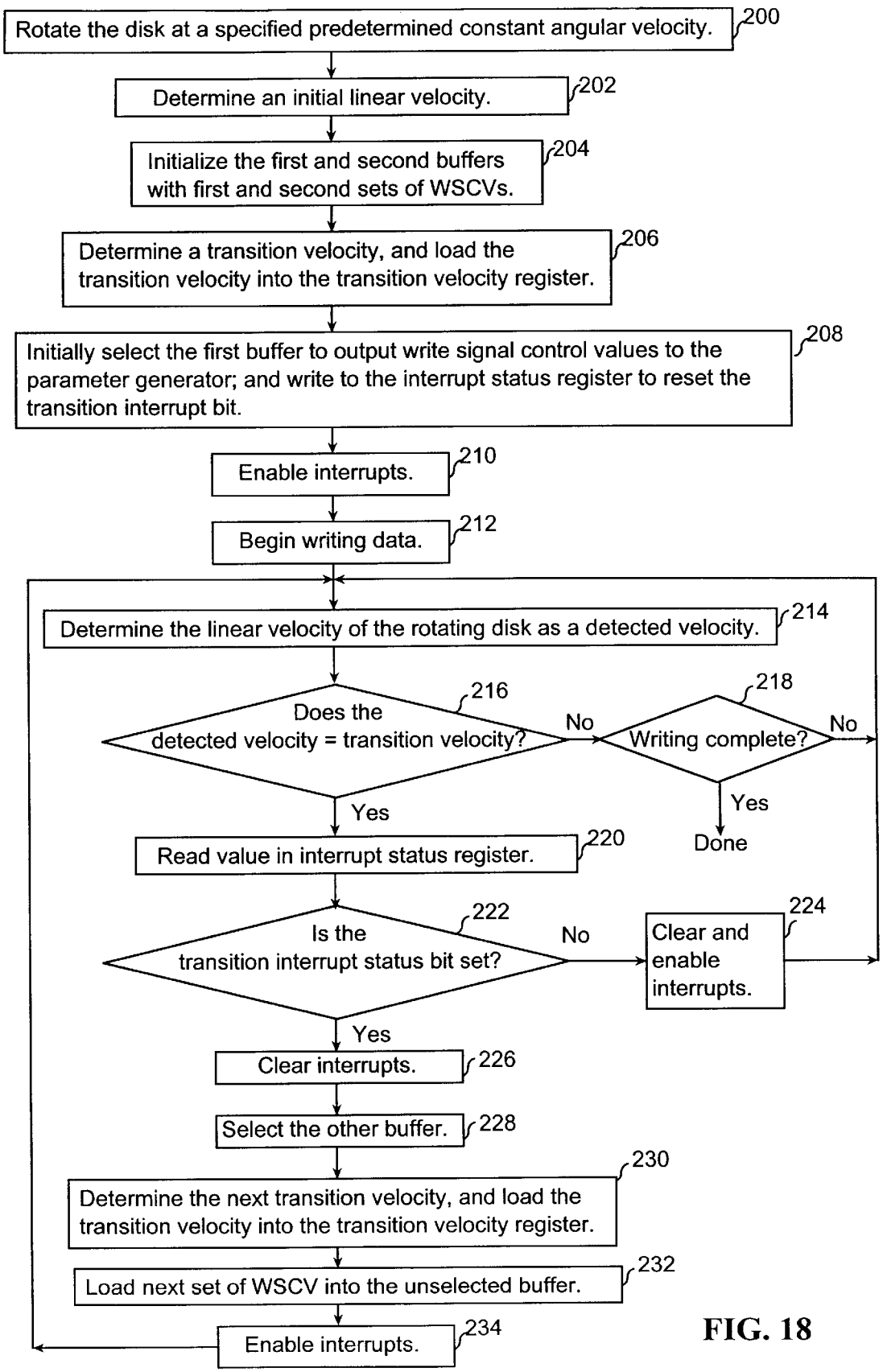
FIG. 18 is a flowchart that illustrates the method of writing data while the disk is rotating at a constant angular velocity in accordance with an embodiment of the present invention.

FIG. 18 illustrates one embodiment of the write_data procedure 132. Referring to both FIGS. 15 and 18, the operation of the write_data procedure 132 and the circuit 80 will be described.

The head assembly is positioned over a target track of the disk. In step 200, the write_data procedure causes the disk to be rotated at a specified predetermined constant angular velocity. In step 202, the velocity detector 144 determines an initial linear velocity of the disk as a detected velocity, and supplies the detected velocity to the executing module 130 via the memory & register access control block 148. Alternately, as described above, the linear velocity is determined from the ATIP information and the specified predetermined constant angular velocity. In step 204, the executing module 130 initializes the first and second buffers, 142-1 and 142-2 of the write value memory 140 with first and second consecutive sets of write signal control values 124, respectively, based on the determined linear velocity. The executing module 130 identifies a first nominal constant linear velocity associated with the determined linear velocity. The executing module 130 sets the switch control bit 172 in the switch control register 170 to equal one to cause the switch 156 to direct write signal control values from the memory 122 to the first buffer 142-1. The first buffer 142-1 is initialized with the set of write signal control values that corresponds to the first nominal constant linear velocity. The executing module 130 then sets the switch control bit 172 to equal zero to cause the switch 156 to direct write signal control values from the memory 122 to the second buffer 142-2. The second buffer 142-2 is then initialized with the next set of write signal control values. For example, if the present nominal constant linear velocity is 4X, the next consecutive nominal constant linear velocity is 5X. The executing module 130 will load the first buffer 142-1 with the set of write signal control values associated with the 4X nominal constant linear velocity, and load the second buffer 142-2 with the set of write signal control values associated with the 5X nominal constant linear velocity.

In step 206, the executing module 130 determines a transition velocity and loads the transition velocity into the transition velocity register 163. The transition velocity is used to select a set of write signal control values as a selected set of write signal control values, with which to generate the EFMD parameters. The transition velocity is selected in accordance with the nominal constant linear velocities determined in step 204. In the following example, the nominal constant linear velocities are even numbers. For example, if the determined linear velocity is associated with a nominal constant linear velocity of 4X, the next consecutive nominal constant linear velocity is 6X, the transition velocity is equal to 5X, the average of the 4X and 6X nominal constant linear velocities. The transition velocity is a threshold value which, when reached, is used to enable the multiplexor 152 to output the next set of write signal control values stored in the write value memory 140. The transition velocity is also used to switch the switch 156 to store the next consecutive set of write signal control values from the memory 122 to the buffer 142 that is not selected by the multiplexor 152. In one embodiment, the transition velocity is equal to the average of the velocity associated with the set of write signal control values being output and the velocity associated with the next set of write signal control values. Although the intermediate velocity is derived from even integer multiples of the 1X nominal constant linear velocity, in alternate embodiments, even finer intervals than the even integer multiples of the 1X nominal constant linear velocity, such as 1X or 0.5X, are used.

In step 208, the executing module 130 loads the switch control bit 172 in the control register 170 with zero to initially select, via the multiplexor 152, the first buffer 142-1 for outputting the write signal control values to the parameter generator 154. The executing module 130 also writes to the interrupt status register 166 to reset the transition interrupt bit 168 to zero.

In step 210, the write_data procedure enables the executing module to respond to interrupts to allow the executing module to determine when the detected velocity is equal to the transition velocity. In step 212, the executing module 130 causes the circuit 80 to begin writing data in accordance with the flowchart of FIG. 17.

In step 214, the velocity detector determines the linear velocity of the rotating disk, as described above, as a detected linear velocity. In step 216, the comparator 164 determines whether the detected linear velocity is equal to the transition velocity in the transition velocity register 163. If not, in step 218, the executing module 130 determines whether writing is complete. If so, the process ends. If not, the process repeats steps 214 and 216.

If, in step 216, the detected velocity is equal to the transition velocity, the, comparator 164 generates the transition pulse. The transition pulse sets the transition interrupt status bit 168 to equal one. The transition interrupt status bit 168 also connects to an interrupt signal input on the executing module 130. When the transition interrupt status bit 168 changes to one, the executing module 130 will recognize that an interrupt occurred. In an alternate embodiment, the executing module 130 determines whether the detected linear velocity of the disk is equal to the transition velocity.

In one implementation, in response to the interrupt, the executing module 130 executes the interrupt procedure 136. The interrupt procedure 136 determines that a transition interrupt occurred, selects the other buffer, determines the new transition velocity, and loads the next set of write signal control values into the unelected buffer.

In particular, in step 220, the executing module 130 reads the value in the interrupt status register 168. In step 222, the executing module 130 determines whether the value of the transition interrupt status bit 168 is equal to one. If not, in step 224, the interrupt status register is cleared, interrupts are enabled and the process returns to step 214.

If the transition interrupt status bit is equal to one, in step 226, the interrupt procedure clears the interrupts by writing to the interrupt status register to set the transition interrupt bit to zero. In step 228, the interrupt procedure 136 selects the other buffer to output write signal control values to the parameter generator by changing the value of the switch control bit to its complementary value to select the other buffer. Following the example above, since buffer 1 142-1 was selected, the switch control bit is set equal to zero and buffer 2 142-2 is now selected to output the write signal control values to the parameter generator 154.

In step 230, the interrupt procedure 136 determines the next transition velocity. To do so, the interrupt procedure 136 determines the next consecutive nominal constant linear velocity, and determines the transition velocity based on the average of the nominal constant linear velocity associated with the selected set of write signal control values and the next consecutive nominal constant linear velocity. In step 230, the interrupt procedure 136 also loads the new transition velocity into the transition velocity register 163. In step 232, the interrupt procedure 130 loads the next set of write signal control values, associated with the next consecutive nominal constant linear velocity of step 230, into the unselected buffer. Following the previous example, the interrupt procedure 136 determines that the next consecutive nominal constant linear velocity is 8X, and that the next transition velocity is equal to 7X, and loads the write signal control values associated with the 8X velocity into buffer 1 142-1. In step 236, the interrupt procedure 136 enables interrupts and the process continues back to step 214. In addition, note that steps 214–234 of the flowchart of FIG. 18 are executed concurrently with steps 190–194 of FIG. 17.

Figure 19:
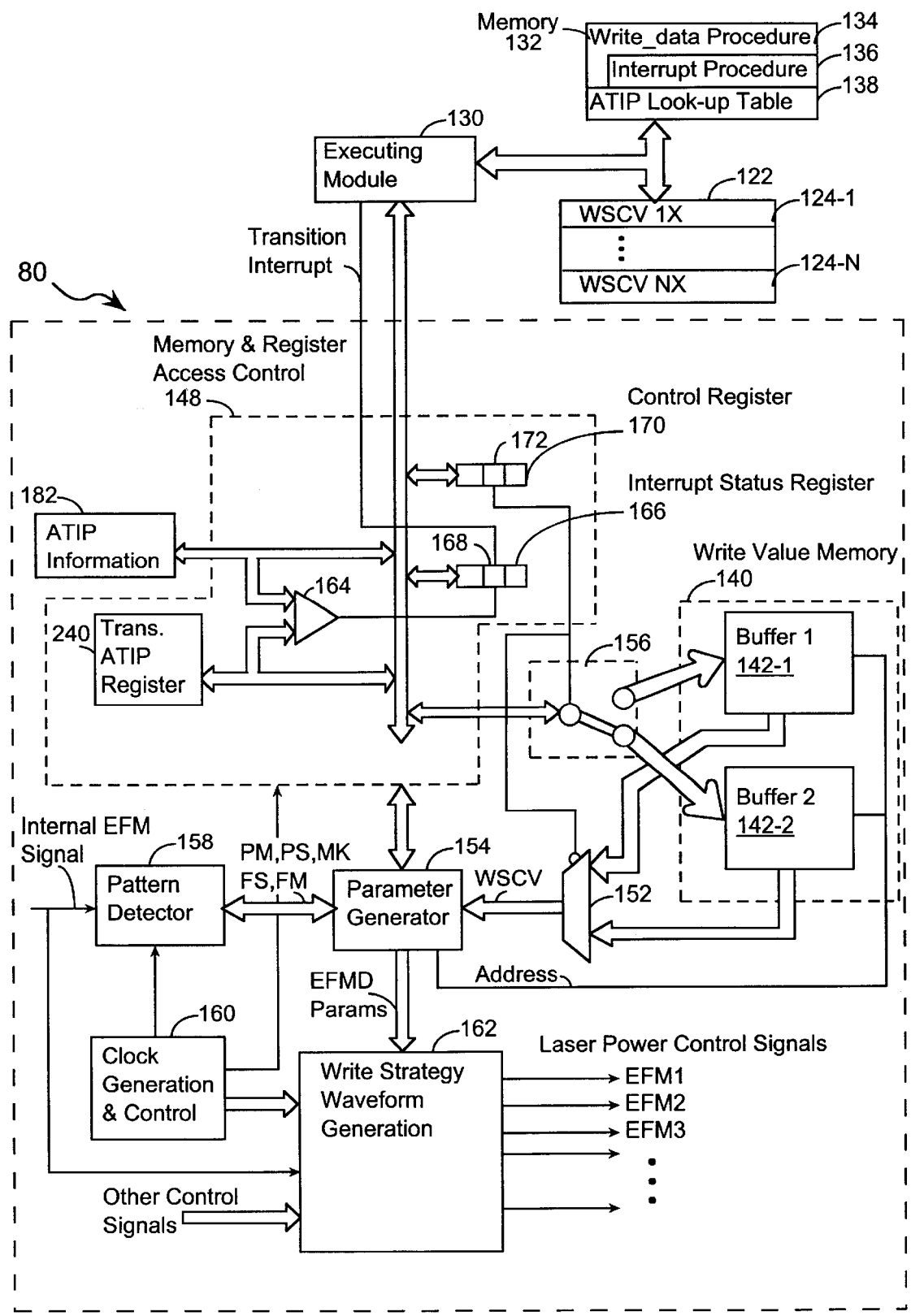
FIG. 19 illustrates a circuit that selects the different sets of write signal control values that are used to write data while the velocity of the disk is changing to a target velocity in accordance with an alternate embodiment of the present invention.

FIG. 19 is a circuit that uses ATIP information rather than the transition velocity to select the different sets of write signal control values. FIG. 19 is similar to FIG. 15, therefore the differences will be described. A transition ATIP register 240 is used rather than the transition velocity register 163 of FIG. 15. In this alternate embodiment, the write_data procedure 134 determines the location at which to change buffers to output the next set write signal control values. The location is specified as ATIP information by specifying the minutes, seconds and frame. The write_data procedure 134 loads this ATIP information into the transition ATIP register 240. The comparator 164 compares the current ATIP information 182 with the ATIP information in the transition ATIP register 240, and generates the transition pulse when the current ATIP information is equal to the transition ATIP information. The flowchart of FIG. 18 applies to the circuit of FIG. 19 except that the ATIP information and the transition ATIP register are used rather than the transition velocity and the transition velocity register.

In an alternate embodiment, data may be written from the outermost track to the innermost track. In this embodiment, in steps 202 and 230, the next nominal constant linear velocity would be the next velocity that is less than the nominal constant linear velocity associated with the set of write signal control values being output.

The present invention may also be used to write data to other disks such as DVD-RAM or DVD-RW while rotating the disk at a constant angular velocity.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A circuit for providing a write signal, comprising:
   a velocity detector to determine a velocity of a rotating disk as a detected velocity;
   a memory that stores at least two sets of write signal control values, each set of write signal control values being associated with a predefined velocity;
   a control circuit to select a first one of said sets of write signal control values based on said detected velocity and a selected predefined velocity; and
   a write strategy circuit to generate one or more write signals in accordance with said write signal control values, wherein said control circuit designates a second set of write signal control values from said sets of write signal control values stored in said memory while said one or more write signals are generated in accordance with said first set of write signal control values;
   wherein said control circuit is configured to select the second set of write signal control values when said detected velocity reaches a transition velocity, so that data is continuously written on the disk while the detected velocity transitions through the transition velocity.

2. The circuit of claim 1, including a switch coupled to the memory and the write strategy circuit, the switch configured to connect the set of write signal control values selected by the control circuit to the write strategy circuit and to transition from the first set of write signal control values to the second set of write signal control values so as to enable continuous writing of data on the disk while the detected velocity transitions through the transition velocity.

3. The circuit of claim 1 wherein said control circuit stores a third set of write signal control values in said memory when said detected velocity reaches said transition velocity.

4. The circuit of claim 1 wherein said memory has at least two ports coupled in parallel to the write strategy circuit, each port being used to access one of said sets of write signal control values; wherein the at least two ports of said memory art coupled in parallel to the write strategy circuit so as to enable a fast transition from the first set of write signal control values to the second set of write signal control values.

5. The circuit of claim 1 wherein said memory includes at least two single ported memories, each single ported memory being used to access one of said sets of write signal control values; wherein the at least two single ported memories are coupled in parallel to the write strategy circuit so as to enable a fast transition from the first set of write signal control values to the second set of write signal control values.

6. The circuit of claim 1 wherein each set of write signal control values is associated with a distinct range of velocities.

7. A method of writing data on a disk, comprising:
   storing at least taco sets of write signal control values;
   detecting a velocity of a rotating disk as a detected velocity;
   designating a first set of write signal control values from said at least two sets of write signal control values in accordance with said detected velocity;
   generating one or more write signals in accordance with said first set of write signal control values; and
   selecting a second set of write signal control values from said at least two sets of write signal control values in accordance with said detected velocity while generating said one or more write signals in accordance with the first set of write signal control values, and then switching to generating the write signals in accordance with the second set of write signal control values, so that data is continuously written on the disk white the detected velocity transitions through a transition velocity.

8. The method of claim 7 further comprising:
   determining the transition velocity based on said detected velocity, wherein said selecting selects said second set of write signal control values when said detected velocity reaches said transition velocity.

9. A method of writing data, comprising:
   rotating a disk at a predetermined constant angular velocity;

detecting a velocity of said disk as a detected velocity;

determining a first set of write signal control values in accordance with said detected velocity, and recording data on said disk by applying said first set of write signal control values to said data;

determining a second set of write signal control values in accordance with the detected velocity while recording data on said disk by applying said first set of write signal control values to said data; and recording data on said disk by applying said second set of write signal control values to said data when said detected velocity reaches a transition velocity so that data is continuously written on the disk while the detected velocity transitions through the transition velocity.

10. The method of claim 9 wherein each set of write signal control values is associated with a distinct range of velocities, and further comprising:

determining a transition velocity based on a velocity associated with said set of write signal control values and a next set of write signal control values.

11. A disk controller, comprising:

a servo system generating signals to cause an actuator to position a head with respect to a target track of a rotating disk, said servo system also generating at least one signal to cause a disk motor to rotate said disk;

a datapath control unit receiving write data to write to said disk from a bus and outputting a write data signal of serially encoded digital data;

a velocity detector to determine a velocity of said disk as a detected velocity;

a memory that stores at least two sets of write signal control values, each set of write signal control values being associated with a predefined velocity;

a control circuit to select a first one of said sets of write signal control values based on said detected velocity and a selected predefined velocity; and a write strategy circuit to generate one or more laser control signals in accordance with said write signal control values, wherein said control circuit designates a second set of write signal control values from said at least two sets of write signal control values stored in said memory while said one or more laser control signals are generated;

wherein said control circuit is configured to select the second set of write signal control values when said detected velocity reaches a transition velocity, so that data is continuously written on the disk while the detected velocity transitions through the transition velocity.

12. The disk controller of claim 11, including a switch coupled to the memory and the write strategy circuit, the switch configured to connect the set of write signal control values selected by the control circuit to the write strategy circuit and to transition from the first set of write signal control values to the second set of write signal control values so as to enable continuous writing of data on the disk while the detected velocity transitions through the transition velocity.

13. The disk controller of claim 11 wherein said control circuit stores a third set of write signal control values in said memory when said detected velocity reaches said transition velocity.

* * * * *

UNITED STATES PATENT AND TRADEMARK OFFICE
CERTIFICATE OF CORRECTION

PATENT NO. : 6,535,470 B1
DATED : March 18, 2003
INVENTOR(S) : Shengquan Wu

It is certified that error appears in the above-identified patent and that said Letters Patent is hereby corrected as shown below:

Column 16,
Line 42, delete "taco" and insert -- two --; and
Line 57, delete "white" and insert -- while --.

Signed and Sealed this

Tenth Day of August, 2004

JON W. DUDAS
*Acting Director of the United States Patent and Trademark Office*